(No Model.) 2 Sheets—Sheet 1.
J. MARSDEN.
CONDUIT FOR GAS, FLUIDS, OR ELECTRIC WIRES.
No. 302,752. Patented July 29, 1884.
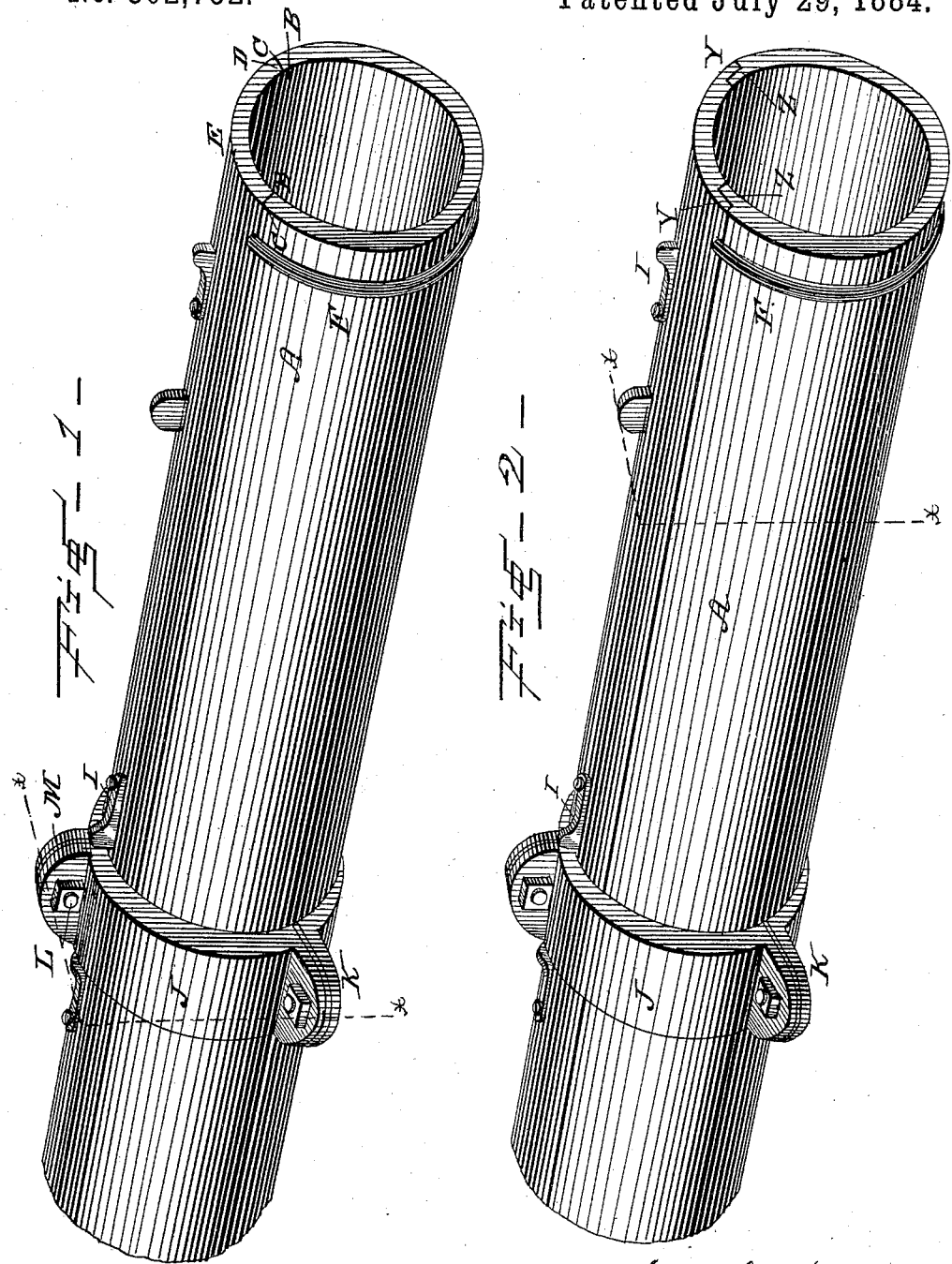
WITNESSES:
Joseph Marsden
INVENTOR.
By Louis Bagger & Co.
ATTORNEYS.

(No Model.) 2 Sheets—Sheet 2.
J. MARSDEN.
CONDUIT FOR GAS, FLUIDS, OR ELECTRIC WIRES.
No. 302,752. Patented July 29, 1884.
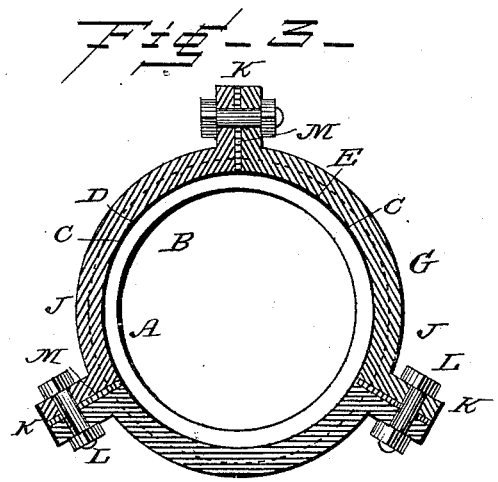
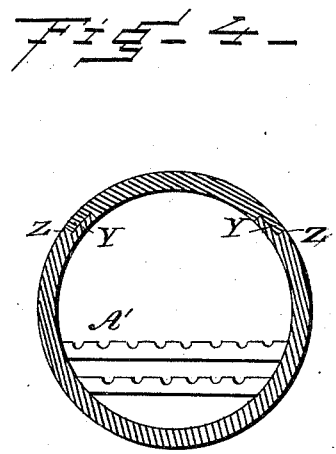
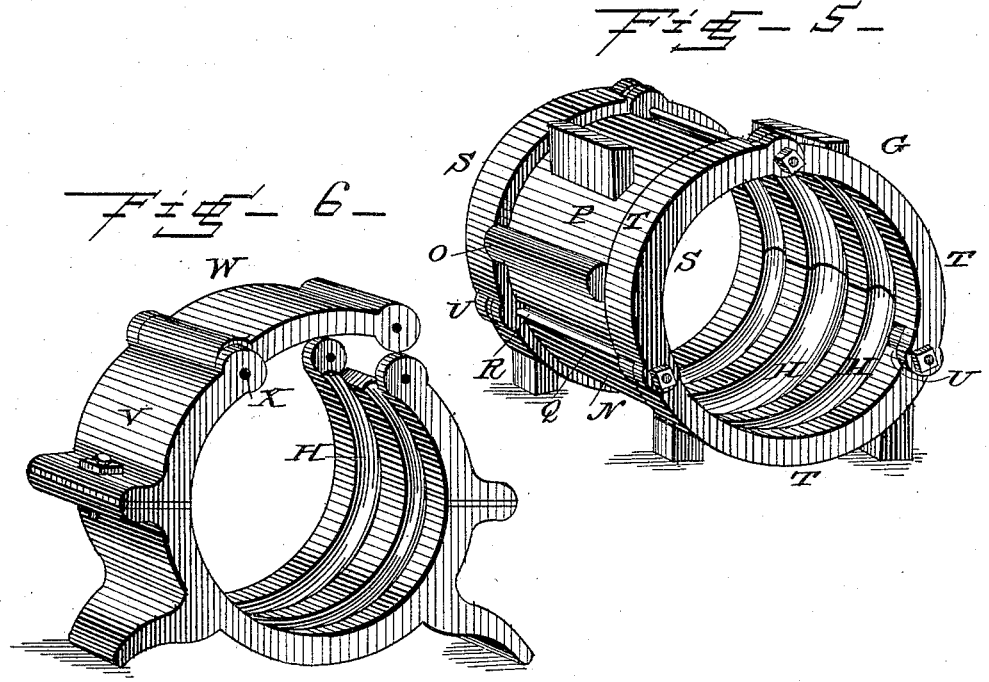
WITNESSES:
Joseph Marsden
INVENTOR.
By Louis Bagger & Co.
ATTORNEYS.

UNITED STATES PATENT OFFICE.

JOSEPH MARSDEN, OF FAR ROCKAWAY, NEW YORK.

CONDUIT FOR GAS, FLUID, OR ELECTRIC WIRES.

SPECIFICATION forming part of Letters Patent No. 302,752, dated July 29, 1884.

Application filed March 3, 1884. (No model.)

*To all whom it may concern:*

Be it known that I, JOSEPH MARSDEN, a citizen of the United States, and a resident of Far Rockaway, in the county of Queens and State of New York, have invented certain new and useful Improvements in Conduits for Gas, Fluids, or Electric Wires; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved pipe or conduit. Fig. 2 is a similar view, showing a slight modification of the same. Fig. 3 is a cross-section on line $x\ x$, Fig. 1. Fig. 4 is a similar view on line $x\ x$, Fig. 2; and Figs. 5 and 6 are perspective detail views of the couplings.

Similar letters of reference indicate corresponding parts in all the figures.

My invention has relation to pipes used for conducting water, gas, steam, sewerage, or similar fluids, or for conducting electric wires; and it consists in the improved construction and combination of parts of the pipe and of the couplings for uniting the ends of the pipes, as hereinafter more fully described and claimed.

In the accompanying drawings, the letter A indicates the pipe, which may be cylindrical or of any desired shape, and of any suitable material, and the upper side of which is open, as shown at B, having mitered or beveled edges C, upon which edges the edges D of the cover E bear, which edges are beveled to an angle corresponding to the bevel of the edges of the main portion of the pipe, the cover forming a continuation of the main body of the pipe. Near the ends of the pipe-sections the main bodies of the same are provided with corrugations F, or annular projections, and the inner sides of the uniting clamps or couplings G are provided with corresponding annular recesses or corrugations, H, which will fit upon the corrugations of the ends of the pipes, holding them together. The ends of the covers are provided with turn-buttons I, which may be turned to bear with their ends against the edges of the couplings, preventing the covers from moving longitudinally, while their extreme ends are held in place under the couplings.

In Fig. 1 the coupling is shown as composed of three segments, J, having their ends bent outward, forming flanges K, through which fastening-screws L may pass, clamping the pieces together around the ends of the pipes, packings M being preferably interposed between the flanges, which may be compressed by the screws.

In Fig. 5 is shown a coupling composed of a lower half, N, having flanged upper edges, O, and an upper half, P, the edges of which rest in the flanged edges of the lower half, and the outer surfaces of the halves of the coupling are provided with three, or more or less, longitudinal grooves, Q, into which the longitudinal coupling-bolts R of two collars, S, bearing against the ends of the coupling, pass, the said collars being composed of segments T, having perforated reduced ends U, through which the bolts pass, forming pintles for the hinges of the collars.

In Fig. 6 is shown another modification of the coupling, consisting of two flanged halves, similar to the flanged segments shown in Figs. 1 and 3, and the upper half, V, is provided with a hinged portion, W, of the same width as the cover, and hinged upon removable pins X, one of which pins may be removed when it is desired to remove the cover from a section of pipe without removing the remainder of the coupling, allowing the hinged segment to swing upward and the cover to be removed. The edges of the cover may be flanged or rabbeted, as shown at Y in Figs. 2 and 4, resting in the rabbeted edges Z of the lower portion of the pipes, and an elastic packing may be interposed between the edges of the cover and of the main body of the pipe, rendering the joints air and water tight.

When the pipes are used as conduits for electric wires, the interior of the pipes is provided with racks or supports A', upon which the wires may be placed, and it will be seen that an easy access may be had to the wires through the cover, the main body of the pipe preventing dirt from falling into the conduit when the trench in which the pipes are laid is opened. It will also be seen that when the pipes are used in sewers, the pipes may be readily cleaned without removing the pipes by simply opening the trench in which they are laid, removing the cover, when the pipe may be cleaned or emptied of its impurities or obstructions.

Having thus described my invention, I claim and desire to secure by Letters Patent of the United States—

1. The combination, with pipe-sections having annular projections at their ends, of a sleeve or collar composed of segments having annular recesses upon their inner sides resting with their flanged ends upon each other, and having longitudinal grooves upon their outer sides, and collars consisting of hinged segments bearing against the ends of the sleeve, and having hinging bolts passing through their joints resting in the grooves in the sleeve and connecting the collars, as and for the purpose shown and set forth.

2. The combination of pipe-sections having their upper sides open and provided with annular projections upon their ends, coupling-sleeves or collars having annular recesses upon their inner sides, and removable covers fitting over the open sides of the pipes resting with their ends under the couplings, and having turn-buttons at their ends adapted to be turned to bear against the ends of the couplings, as and for the purpose shown and set forth.

In testimony that I claim the foregoing as my own I have hereunto affixed my signature in presence of two witnesses.

JOSEPH MARSDEN.

Witnesses:
JOHN J. FINNEY,
CHARLES W. GOULD.